US008589718B2

(12) United States Patent
Lin et al.

(10) Patent No.: US 8,589,718 B2
(45) Date of Patent: Nov. 19, 2013

(54) PERFORMANCE SCALING DEVICE, PROCESSOR HAVING THE SAME, AND PERFORMANCE SCALING METHOD THEREOF

(75) Inventors: Chi-Hung Lin, Kaohsiung County (TW); Pi-Cheng Hsiao, Taichung (TW); Tay-Jyi Lin, Kaohsiung County (TW); Gin-Kou Ma, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 620 days.

(21) Appl. No.: 12/881,190

(22) Filed: Sep. 14, 2010

(65) Prior Publication Data
US 2011/0314306 A1 Dec. 22, 2011

(30) Foreign Application Priority Data

Jun. 21, 2010 (TW) .............................. 99120095 A

(51) Int. Cl.
*G06F 1/00* (2006.01)
(52) U.S. Cl.
USPC .......... 713/501; 713/300; 713/320; 713/322; 713/500; 713/503; 713/600
(58) Field of Classification Search
USPC .......... 713/300, 320, 322, 500, 501, 503, 600
See application file for complete search history.

(56) References Cited

U.S. PATENT DOCUMENTS

| 6,559,492 | B1 | 5/2003 | Hazucha et al. | |
| 6,986,116 | B2 * | 1/2006 | Fry et al. ........................ | 716/113 |
| 7,080,267 | B2 * | 7/2006 | Gary et al. ..................... | 713/300 |
| 7,155,617 | B2 * | 12/2006 | Gary et al. ..................... | 713/300 |
| 7,463,096 | B2 | 12/2008 | Chi et al. | |
| 8,046,601 | B1 * | 10/2011 | Paz et al. ....................... | 713/300 |
| 8,051,312 | B2 * | 11/2011 | Foley ............................. | 713/321 |
| 2006/0282692 | A1 | 12/2006 | Oh | |
| 2008/0282102 | A1 * | 11/2008 | Reddy et al. .................. | 713/323 |
| 2011/0004774 | A1 * | 1/2011 | Hansquine et al. ........... | 713/310 |

OTHER PUBLICATIONS

Wei-Bin Yang, "The New Approach of Programmable Pseudo Fractional-N Clock Generator for GHz Operation with 50% Duty Cycle" in Proc. ECCTD, Aug. 2005. 4pages.
Wei-Ming Lin, "An all-digital clock generator for dynamic frequency scaling." Graduate Institute of Electronics Engineering & Department of Electrical Engineering National Taiwan University, Taipei, Taiwan. Apr. 2009. 4pages.
James Tschanz, "Adaptive frequency and biasing techniques for tolerance to dynamic temperature-voltage variations and aging." IEEE International Solid State Circuits Conference, Feb. 2007. 3pages.

* cited by examiner

*Primary Examiner* — Jaweed A Abbaszadeh
(74) *Attorney, Agent, or Firm* — Jianq Chyun IP Office

(57) ABSTRACT

A performance scaling device, a processor having the same, and a performance scaling method thereof are provided. The performance scaling device includes an adaptive voltage scaling unit, a latency prediction unit, and a variable-latency datapath. The adaptive voltage scaling unit generates a plurality of operation voltages and transmits the operation voltages to the variable-latency datapath. The variable-latency datapath operates with different latencies according to the operation voltages and generates an operation latency. The latency prediction unit receives the operation latency and a system latency tolerance and generates a voltage scaling signal for the adaptive voltage scaling unit according to the operation latency and the system latency tolerance. The adaptive voltage scaling unit outputs and scales the operation voltages thereof according to the voltage scaling signal.

12 Claims, 7 Drawing Sheets

US 8,589,718 B2

PERFORMANCE SCALING DEVICE, PROCESSOR HAVING THE SAME, AND PERFORMANCE SCALING METHOD THEREOF

CROSS-REFERENCE TO RELATED APPLICATION

This application claims the priority benefit of Taiwan application serial no. 99120095, filed on Jun. 21, 2010. The entirety of the above-mentioned patent application is hereby incorporated by reference herein and made a part of this specification.

TECHNICAL FIELD

The disclosure relates to a performance scaling device adaptable to a processor that supports fine-grain performance scaling, wherein the performance of the processor can be scaled according to an operation voltage and a variable latency of a datapath.

BACKGROUND

In an existing portable device, communication, video, audio, and multimedia applications are usually integrated into a single system in order to meet different user requirements. Accordingly, the design of the system gets very complicated. However, other factors of the system, such as the power consumption and battery lifespan, have to be taken into consideration at the same time when all user requirements are being satisfied. Thereby, system power consumption management has become an increasingly focused subject in the industry.

Dynamic voltage and frequency scaling (DVFS) is a very typical power consumption management technique, wherein the power consumption of a system is reduced by dynamically scaling the voltage and frequency (so that the system meets the lowest performance requirement) according to the requirements of different applications. FIG. 1 is a diagram of a conventional DVFS system. Referring to FIG. 1, the conventional DVFS system 100 includes a DVFS control unit 110, a clock generation unit 120, a power conversion unit 130, and a processor 140.

The DVFS system 100 determines a plurality of operating points before it starts its operation. Each operating point includes an operation frequency and a corresponding lowest voltage. The DVFS control unit 110 controls the power conversion unit 130 to convert an input voltage $V_{IN}$ into an operation voltage $V_{DD}$, in turn outputting the operation voltage $V_{DD}$ to the processor 140 according to a selected operating point. Meanwhile, the DVFS control unit 110 controls the clock generation unit 120 to generate a clock signal CLK and outputs the clock signal CLK to the processor 140 according to the operating point.

When the DVFS system 100 is in operation, it works with one operating point. However, if the performance of the DVFS system 100 is to be increased, the DVFS control unit 110 first controls the power conversion unit 130 to increase its output voltage $V_{DD}$, and then controls the clock generation unit 120 to increase the frequency of the clock signal CLK according to the predetermined operating point. On the contrary, if the performance of the DVFS system 100 is to be decreased, the DVFS control unit 110 reduces the frequency of the clock signal CLK before it reduces the operation voltage $V_{DD}$. Accordingly, different frequencies and voltages are used with respect to different execution processes in an application thus reducing the power consumption.

However, some other overheads have to be taken into consideration when the DVFS system 100 is adopted, which will be further explained below.

Regarding the scaling of frequency, the clock generation unit 120 adopts a phase-locked loop (PLL) structure, requiring hundreds of reference clock cycles to complete one scaling operation. The latency of the hundreds of reference clock cycles results in a greater overhead on the performance of the DVFS system 100. Also, a shortest time limitation exists between two consecutive frequency scaling since the DVFS system 100 cannot work again before a frequency scaling operation is completed. In addition, by scaling the frequency of the DVFS system 100 with a PLL structure, it still has many limitations on working frequency and is insufficient to applications having different performance requirements. For example, in the reference article of "An all-digital clock generator for dynamic frequency scaling" published by W. H. Lin, C. C. Chen, and S. I. Liu in Proc. VLSI-DAT in April 2009, the scaling time is shortened by adopting a frequency divider along with the PLL structure. However, in such a structure, the frequency divisor has to be a power of 2. Thus, a DVFS system adopting such a structure can only provide a specific frequency setting due to the limitation in the frequency division, and such a specific frequency setting cannot satisfy the lowest performance requirements of different applications.

Presently, the scaling of voltage is usually accomplished by using an external DC-to-DC converter or a power management integrated circuit (PMIC), and herein the PMIC is controlled by using an inter-integrated circuit (I²C) control interface. A long conversion latency may be expected in the scaling of voltage.

As described above, even though the DVFS technique can improve the power consumption of a system, the corresponding overheads have to be evaluated and considered carefully when an application is designed based on the DVFS technique. For example, it takes about 200 microseconds (µs) to scale the frequency, about 200 µs to control an external PMIC through an I²C control interface, and about 750 µs to scale the voltage. All these time consumptions may affect the performance and power of the entire circuit design.

SUMMARY

A performance scaling device, a processor having the same, and a performance scaling method thereof are introduced herein.

According to an exemplary embodiment of the present disclosure, a performance scaling device adaptable to a processor that supports fine-grain performance scaling is provided, wherein the performance of the processor is scaled according to an operation voltage and a variable latency of a datapath. The performance scaling device includes an adaptive voltage scaling unit and a latency prediction unit. The adaptive voltage scaling unit generates a plurality of operation voltages and transmits the operation voltages to the variable-latency datapath. The latency prediction unit receives a system latency tolerance and an operation latency of the datapath and generates a voltage scaling signal for the adaptive voltage scaling unit according to the system latency tolerance and the operation latency of the datapath. The adaptive voltage scaling unit outputs and scales the operation voltage of a power domain according to the voltage scaling signal.

According to another embodiment, a processor supporting fine-grain performance scaling is provided. The processor includes a variable-latency datapath and a performance scaling device. The variable-latency datapath has an operation latency and includes a plurality of power domains. The performance scaling device receives a system latency tolerance and the operation latency of the variable-latency datapath. It then generates a voltage scaling signal according to the system latency tolerance and the operation latency of the variable-latency datapath. Finally, the performance scaling device outputs and scales the operation voltages of the power domains according to the voltage scaling signal.

According to yet another embodiment, a performance scaling method adaptable to a variable-latency processor is provided. In the present method, an operating point is selected according to a performance requirement corresponding to a scaling requirement event, wherein the frequency of the operating point is greater than or equal to the frequency of the performance requirement. If the frequency of the performance requirement conforms to a plurality of operating points supported by the processor, a clock signal and a corresponding voltage are output to the variable-latency processor according to the plurality of operating points. If the frequency of the performance requirement does not conform to any operating point supported by the variable-latency processor, an operating point having its frequency higher than but closest to the frequency of the performance requirement is selected. Next, the clock signal and the corresponding voltage of the selected operating point are output as initial values, and an adaptive voltage scaling procedure is performed according to the initial voltage. The adaptive voltage scaling procedure includes scaling the lowest operation voltage output to a power domain according to a system latency tolerance and an operation latency of a datapath so as to meet different performance requirements.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
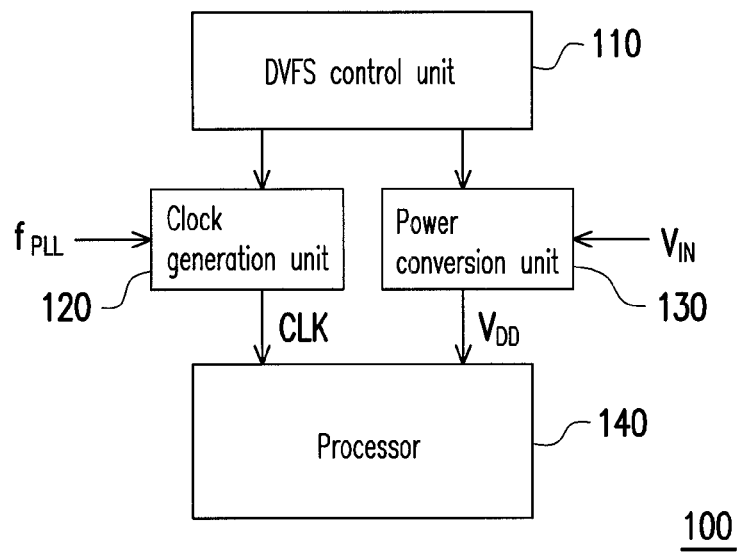
FIG. 1 is a diagram of a dynamic voltage and frequency scaling (DVFS) system.

An embodiment provides a performance scaling device, a performance scaling method, and a variable-latency processor using the same.

In the present embodiment, a voltage and performance management system with reduced dynamic voltage and frequency scaling (DVFS) overheads is provided. A fine-grain frequency scaling technique is adopted to provide continuous frequency scaling to overcome the limitation in frequency scaling in the conventional DVFS technique. Also, the latency overhead in voltage and frequency scaling is reduced through a variable-latency design and an adaptive voltage control technique. Thereby, a more effective power consumption management is accomplished. Herein the adaptive voltage control refers to a mechanism for scaling the voltage of a system by dynamically monitoring the performance of the system.

In the voltage and performance management system with reduced DVFS overheads provided by an exemplary embodiment, a fine-grain voltage and performance scaling system adaptable to a processor having a low power consumption is provided, wherein the setting and scaling of frequency and voltage are carried out through a coarse-grain method or a fine-grain method.

To keep the original advantage of instant operating point switching, a frequency and voltage setting a scaling structure similar to that in the conventional DVFS technique is adopted. The system determines a plurality of operating points before it starts to operate. When the system is in operation, the corresponding operating point is selected and adjusted according to different application requirements so as to satisfy the lowest system requirement. This technique is referred to as a coarse-grain method.

If there is no operating point corresponding to a performance requirement, a scaling method adaptable to the fine-grain voltage and performance scaling system is provided in the present embodiment. When the lowest performance requirement is not a frequency supported by the operating point, a system latency tolerance is used as a specific parameter in fine-grain scaling. Then, the system is scaled to have the lowest performance and voltage through adaptive voltage control. This is the fine-grain voltage scaling method provided by the present embodiment.

The coarse-grain or fine-grain method provided by foregoing embodiment is not intended to limit the application of the present disclosure. In the fine-grain voltage and performance scaling system provided by this embodiment, both coarse-grain and fine-grain techniques or only the fine-grain technique may be adopted for scaling the frequency and voltage appropriately. The adaptive voltage control mechanism includes performing a multi-step voltage scaling or a continuous voltage scaling in the system. The voltage scaling may also be controlled by an external power management integrated circuit (PMIC) through an inter-integrated circuit ($I^2C$) control interface. However, the present disclosure is not limited thereto.

In an embodiment, a processor including a variable-latency datapath, an instruction dispatcher, a voltage scaling unit, and a performance scaling device is provided. The variable-latency datapath operates with different latencies and generates an operation latency. The instruction dispatcher receives the operation latency of the variable-latency datapath to determine whether to stop dispatching operations to the datapath, and the instruction dispatcher generates a stall signal for the datapath and waits for the variable-latency datapath to complete its operation. The voltage scaling unit generates a plurality of operation voltages and sends the operation voltages to the variable-latency datapath. The performance scaling device receives the operation latency of the variable-latency datapath and the system latency tolerance and generates a voltage scaling signal for the voltage scaling unit accordingly, so as to control the operation voltage of the variable-latency datapath.

In the fine-grain voltage and performance scaling system provided by the present embodiment, a latency tolerance estimation and adaptive voltage control mechanism is added to the frequency and voltage scaling method.

First, if there is no operating point corresponding to the lowest frequency requirement of a system application, an operating point higher than but closest to the frequency requirement is selected, and the frequency of the operating point is set as the system frequency. Then, a corresponding system latency tolerance is calculated. The relationship between the frequency requirement and the system latency tolerance is expressed in following expression (1):

frequency requirement=lowest supported frequency−(lowest supported frequency×system latency tolerance)     (1)

In other words, the system latency tolerance can be obtained through following expression (2):

system latency tolerance=(lowest supported frequency−frequency requirement)/lowest supported frequency     (2)

In an exemplary embodiment, the operation frequency of the system is set to the frequency of the operating point that is higher than but closest to the frequency requirement, and the system latency tolerance of the latency prediction unit is set as the result of foregoing expression (2). The adaptive voltage scaling unit estimate the voltage according to the operation latency of the datapath and the system latency tolerance and sets the PMIC of the system accordingly. In another embodiment, the datapath is divided into a plurality of independent power domains. The adaptive voltage scaling unit estimate the voltage according to the operation latency of the datapath and the system latency tolerance and generates a voltage control signal for each power domain of the datapath accordingly.

For example, assuming that only three operating points (frequency/voltage) of 300 MHz/1.2V, 200 MHz/1.0V, and 100 MHz/0.9V are supported by a system, if the desired frequency is 250 MHz, in the performance scaling method provided by the present embodiment, the operating point of 300 MHz/1.2V and the 16% system latency tolerance are adopted to achieve the desired performance. In another example, if the frequency desired by the user is 180 MHz, the operating point of 200 MHz/0.9V and the 10% system latency tolerance are adopted to achieve the desired performance. The system latency tolerance is not limited to a specific value, and in an embodiment, the system latency tolerance may be selected within a range (for example, between 15% and 17%) or adjusted according to the design requirement.

A variable-latency design is introduced in the adaptive voltage control mechanism. The variable-latency design is adaptable to a system with variable cycles other than a system with a single cycle in the worst case. Namely, no safe margin is to be reserved. In an embodiment, single-cycle processes are executed in a faster datapath, while two-(or more-) cycle processes are executed in a slower datapath. With such a structure, more single-cycle processes are executed when the voltage is increased, and contrarily, more two-cycle processes are executed when the voltage is decreased. Thus, the performance requirement can be met by scaling the voltage appropriately.

Additionally, regarding the voltage scaling in the adaptive voltage control mechanism, a design of dithering power control is adopted in an embodiment. However, the present disclosure is not limited to this design. The voltage dithering is to divide a processor into a plurality of power domains and provide a group of high voltages and a group of low voltages to achieve a voltage scaling effect. Each power domain is corresponding to one power switch. The power switch instantly switches the corresponding power domain between the high voltage and the low voltage so as to achieve a multi-step voltage scaling effect.

Figure 2:
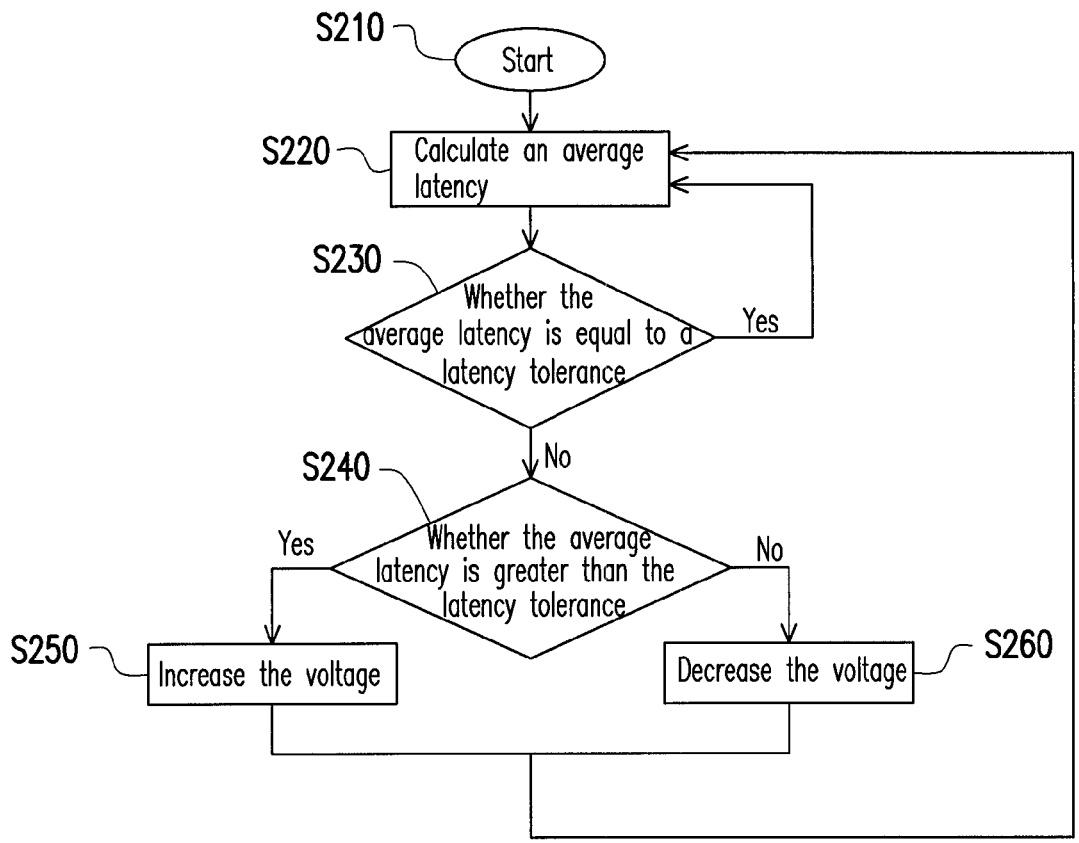
FIG. 2 is a flowchart of a performance scaling method according to an embodiment.

FIG. 2 is a flowchart of a performance scaling method according to an embodiment. Referring to FIG. 2, first, in step S210, the frequency and voltage are appropriately scaled through a fine-grain method. Then, in step S220, an average latency is calculated, wherein the average latency represents the latency of a datapath in the processor. Next is step S230, which determines whether the average latency is equal to a system latency tolerance. If the average latency is equal to the system latency tolerance, the procedure returns to step S220 to calculate the average latency again. Otherwise, if the average latency is greater than the system latency tolerance, step S240 is executed. Similarly, step S240 determines whether the average latency is greater than the system latency tolerance. If the average latency is greater than the system latency tolerance, in step S250, the voltage of the corresponding power domain in the datapath is increased. Otherwise, in step S260, the voltage of the corresponding power domain in the datapath is decreased. After that, the procedure returns to step S220.

The voltage is automatically scaled to meet the lowest performance requirement.

Below, exemplary embodiments of a voltage and performance management system with reduced DVFS overheads will be described with reference to accompanying drawings.

Figure 3A:
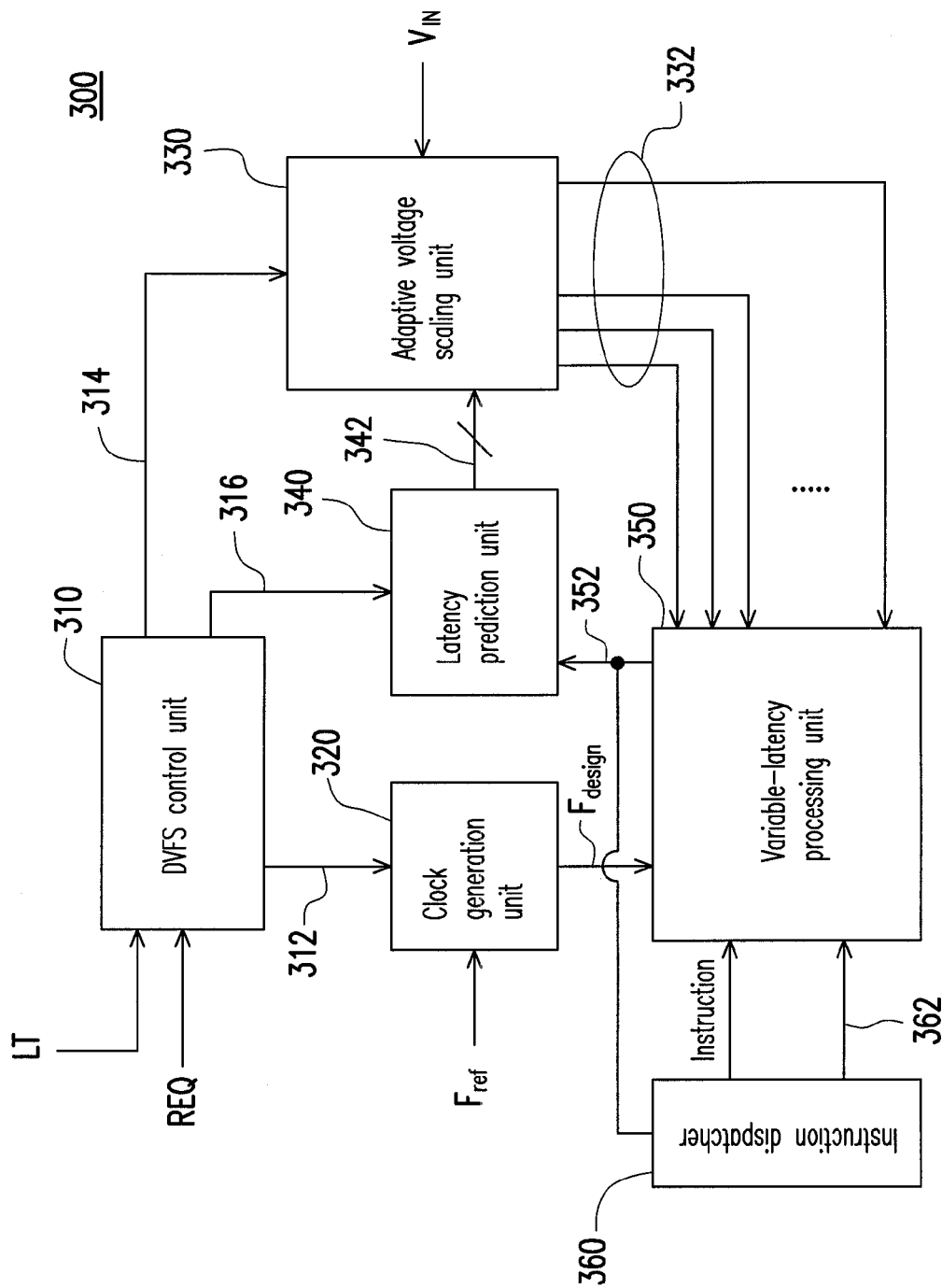
FIGS. 3A-3C are circuit block diagrams illustrating different implementations of a voltage and performance management system adaptable to a processor having a low power consumption.

FIG. 3A illustrates a voltage and performance management system adaptable to a processor with low power consumption. The voltage and performance management system 300 includes a DVFS control unit 310, a clock generation unit 320, an adaptive voltage scaling unit 330, a latency prediction unit 340, a variable-latency processing unit 350, and an instruction dispatcher 360.

When a performance scaling requirement event occurs (i.e., when the DVFS control unit 310 is requested to perform frequency and voltage scaling), the DVFS control unit 310 receives an initial request signal REQ. Then, the DVFS control unit 310 determines whether the predetermined operating points are conformed according to the initial request signal REQ.

If the frequency of an operating point is conformed, the operating point is directly selected for scaling the frequency and the voltage. For example, a control signal 312 is sent to the clock generation unit 320 so that the clock generation unit 320 generates a clock signal corresponding to the frequency $F_{design}$ of the operating point. A control signal 314 is sent to the adaptive voltage scaling unit 330 so that the adaptive voltage scaling unit 330 generates a voltage 332 corresponding to the operating point. The adaptive voltage scaling unit 330 outputs the voltage 332 to the variable-latency processing unit 350. This is an example of the aforementioned coarse-grain method.

If no operating point is supported corresponding to a frequency requirement, the DVFS control unit 310 selects an operating point higher than but closest to the frequency requirement and further provides a system latency tolerance. The system latency tolerance can be obtained through the expression (2). Herein the system latency tolerance may be calculated in advance through offline calculations or through online calculations by disposing a calculation circuit in the DVFS control unit 310. Finally, the DVFS control unit 310 sends the system latency tolerance 316 to the latency prediction unit 340.

The latency prediction unit 340 also obtains an operation latency 352 of the system from the variable-latency processing unit 350. The operation latency 352 can be obtained from a datapath in the variable-latency processing unit 350. The operation latency 352 is also sent to the instruction dispatcher 360. The instruction dispatcher 360 receives the operation latency 352 and determines whether to stop dispatching instructions to the datapath in the variable-latency processing unit 350 according to the operation latency 352, and the instruction dispatcher 360 generates a stall signal 362 for the datapath and waits for it to complete its operation.

The latency prediction unit 340 calculates an average latency of the system. The average latency represents the latency of the processor, and which may be obtained from different datapaths or from datapaths in different power domains Thereafter, the latency prediction unit 340 determines whether the average latency is greater than the system latency tolerance LT and outputs a control signal 342 to the adaptive voltage scaling unit 330. The latency prediction unit 340 performs subsequent operations in different datapaths in parallel and sends the result to the adaptive voltage scaling unit 330 through the control signal 342.

The adaptive voltage scaling unit 330 increases or decreases the voltages supplied to different voltage lines 332 of the variable-latency processing unit 350 according to the control signal 342. The voltage lines 332 have a plurality of paths connected to different datapaths in the variable-latency processing unit 350 or to datapaths in different power domains, so as to provide different voltages. The control signal 342 may be an encoding signal, and which can be used for controlling a plurality of switches in the voltage dithering control structure in parallel or directly sent to an external PMIC through an I$^2$C control interface.

According to an embodiment, in the voltage and performance management system 300, all or some of the DVFS control unit 310, the clock generation unit 320, the adaptive voltage scaling unit 330, the latency prediction unit 340, and the variable-latency processing unit 350 may be fabricated on a system on chip (SoC) according to the actual design requirement. To follow the original design of the voltage and performance management system 300, only the DVFS control unit 310, the clock generation unit 320, the latency prediction unit 340, and the variable-latency processing unit 350 are fabricated in the SoC, and the voltages of different datapaths or different power domains in the processor are controlled through an external PMIC. However, in order to improve the performance, all or some of the components of the adaptive voltage scaling unit 330 may be integrated into the SoC. For example, in an embodiment, the voltage is scaled through a dithering voltage control mechanism.

Figure 3B:
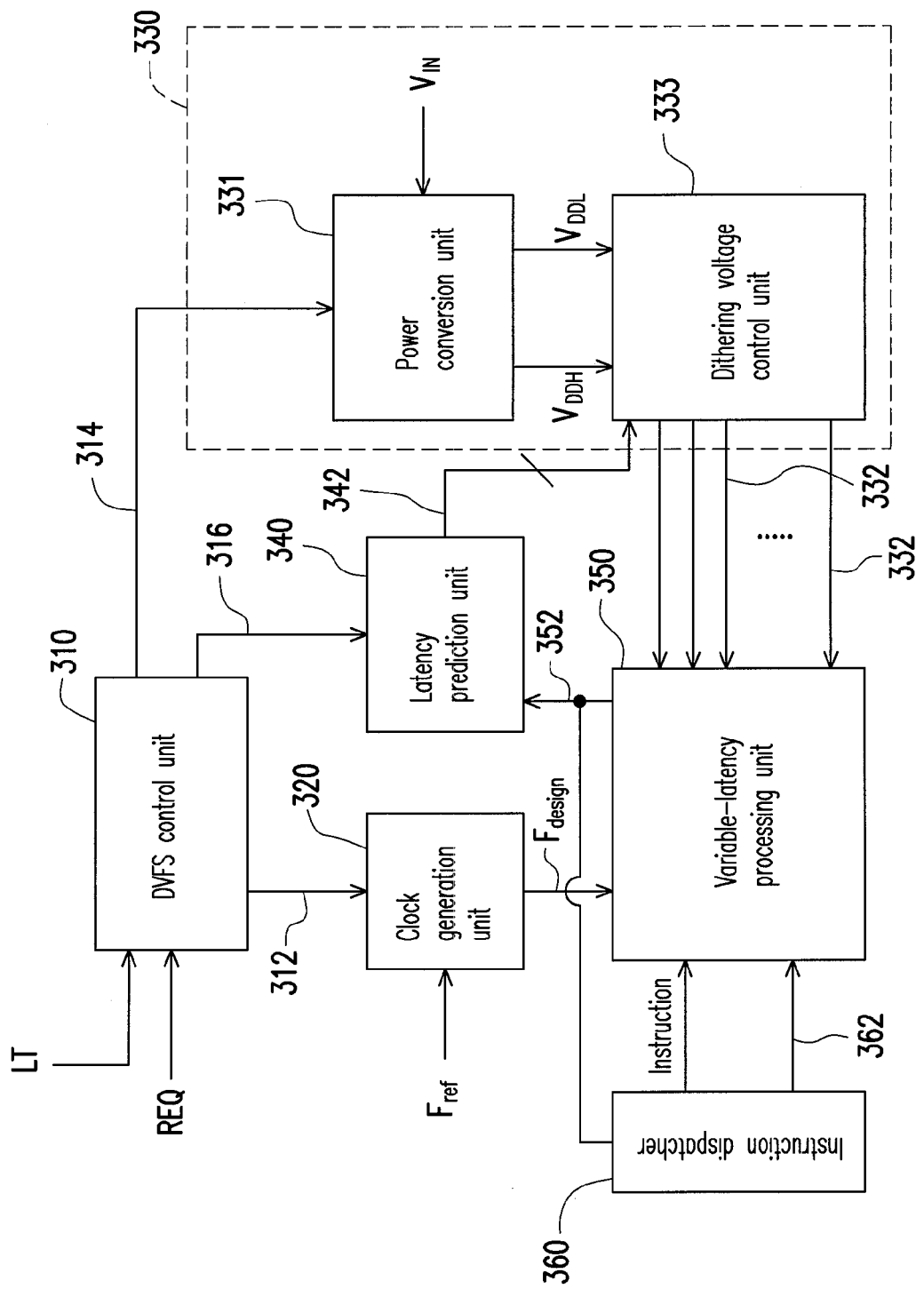

FIG. 3B illustrates a voltage and performance management system adaptable to a processor with low power consumption. The voltage and performance management system has a built-in voltage scaling circuit. Aspects in FIG. 3B that are the same as those in FIG. 3A will not be described herein. Herein only different implementation of the adaptive voltage scaling unit 330 will be described with reference to exemplary embodiment. In the present embodiment, the adaptive voltage scaling unit 330 includes a power conversion unit 331 and a dithering voltage control unit 333. The power conversion unit 331 receives the control signal 314 from the DVFS control unit 310 to perform a voltage conversion and then provide a high operation voltage $V_{DDH}$ and a low operation voltage $V_{DDL}$ to the dithering voltage control unit 333. The dithering voltage control unit 333 receives the control signal 342 from the latency prediction unit 340 and respectively outputs the high operation voltage $V_{DDH}$ and the low operation voltage $V_{DDL}$ to different datapaths or different power domains in the variable-latency processing unit 350 via different voltage lines 332 according to the control signal 342.

Figure 3C:
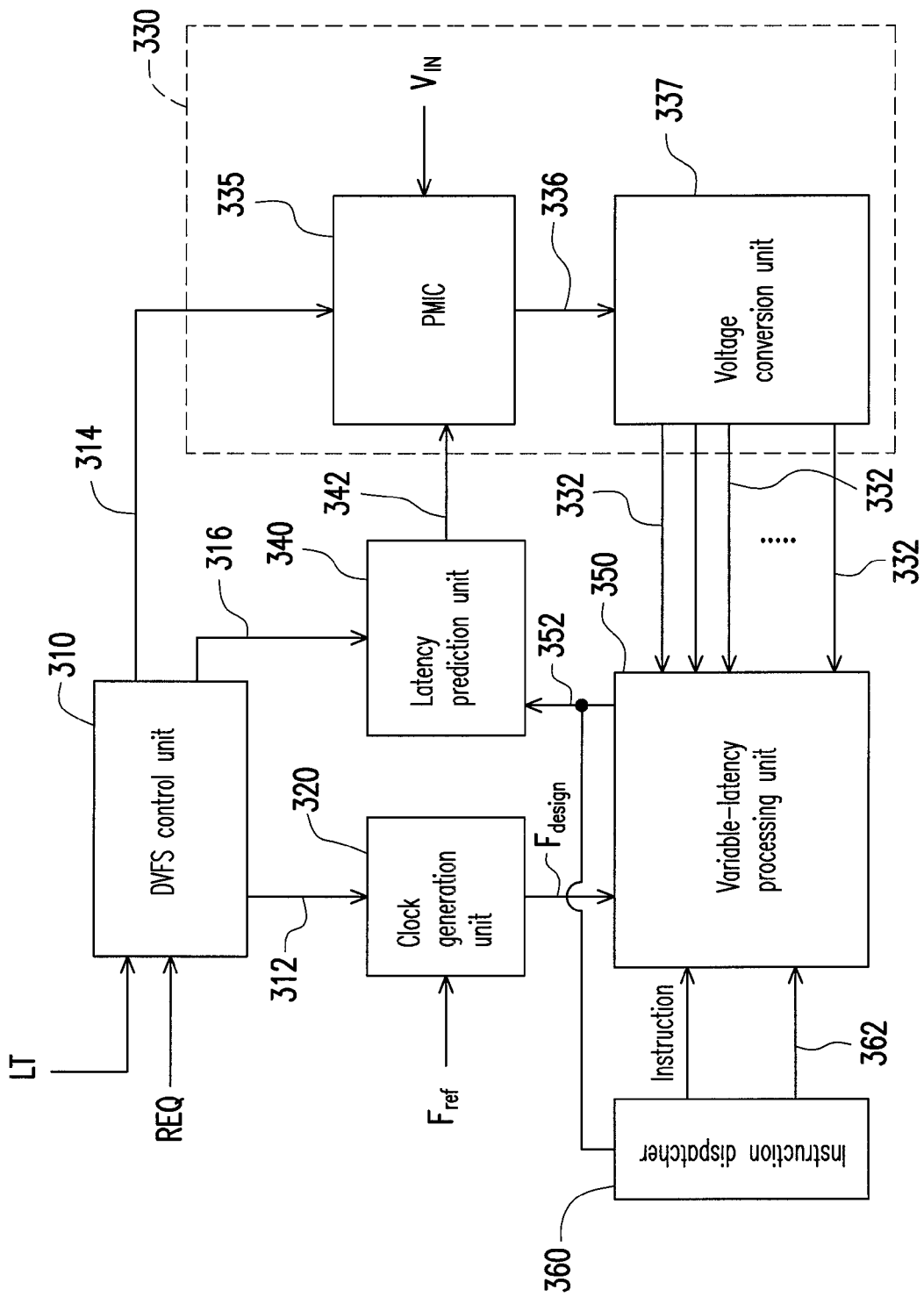

FIG. 3C is a circuit block diagram of a voltage and performance management system with an external power management mechanism. Aspects that are the same as those illustrated in FIG. 3A will not be described herein. Only different implementations of the adaptive voltage scaling unit 330 will be described herein with reference to exemplary embodiment. In the present embodiment, the adaptive voltage scaling unit 330 includes a PMIC 335 and a voltage conversion unit 337. The PMIC 335 receives the control signal 314 from the DVFS control unit 310 to perform a voltage conversion and then outputs a control signal 336 to the voltage conversion unit 337 according to the control signal 342 output by the latency prediction unit 340. The PMIC 335 outputs different operation voltages to different datapaths or different power domains in the variable-latency processing unit 350 via different voltage lines 332.

Figure 4:
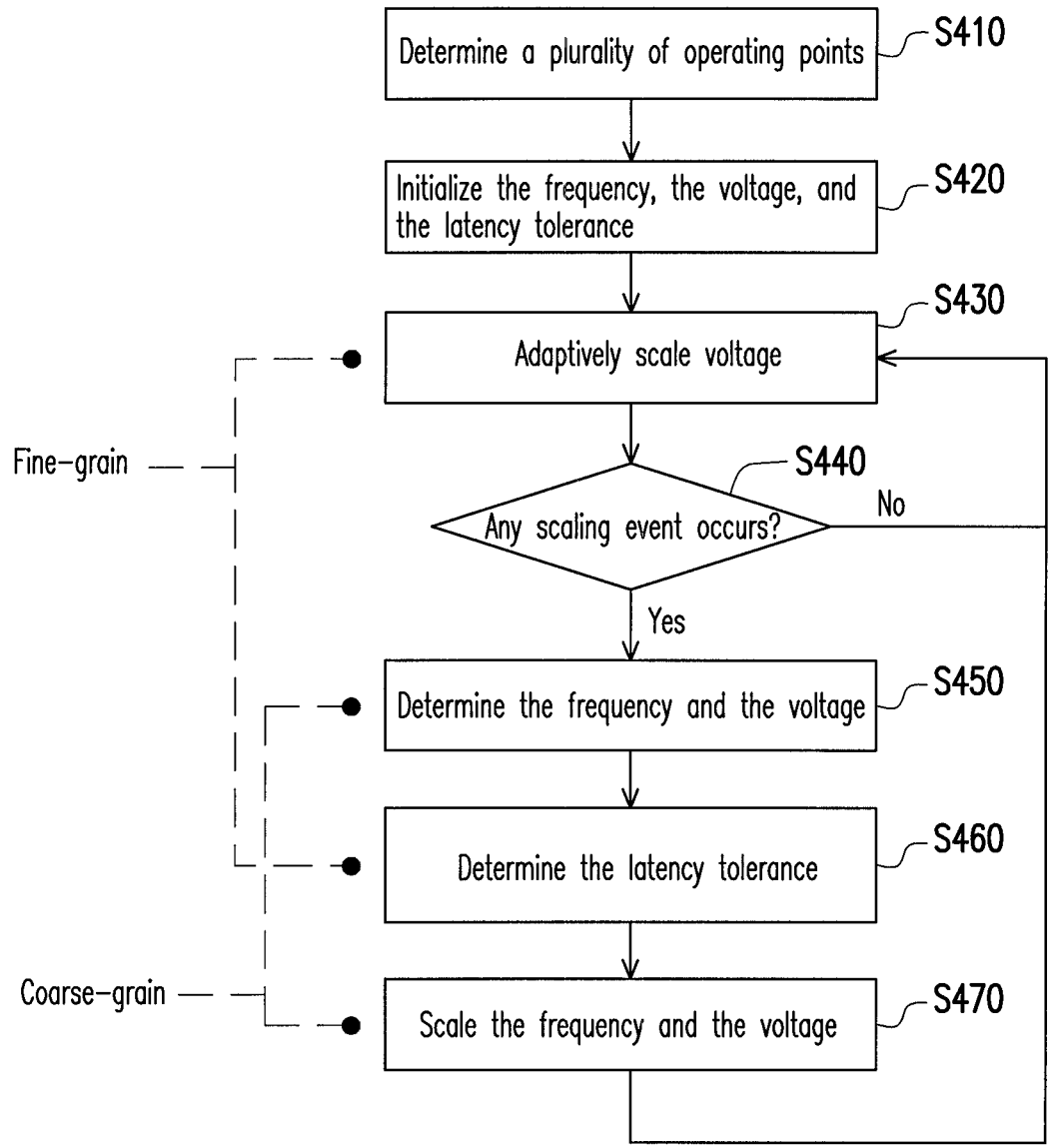
FIG. 4 is a flowchart of a performance scaling method of a voltage and performance management system adaptable to a processor having a low power consumption.

FIG. 4 is a flowchart of a performance scaling method of a voltage and performance management system adaptable to a processor having low power consumption.

First, in step S410, a plurality of operating points is determined according to the requirement of an applications program before the applications program is executed, so that the corresponding operating point can be switched to according to different performance requirements when the application program is executed.

Then, in step S420, an initial operating point is determined before the applications program is executed, and the frequency, voltage, and system latency tolerance are initialized according to the selected operating point. If the corresponding operating point is determined, the corresponding frequency and voltage are determined according to the operating point. If no corresponding operating point is determined, an operating point higher than but closest to the frequency requirement is selected, and the frequency and voltage are scaled according to this operating point. After that, the adaptive voltage scaling in step S430 is executed. In an embodiment, the voltage scaling procedure can be referred to the adaptive voltage control mechanism illustrated in FIG. 2. Next, whether a performance scaling request is received is determined (i.e., whether a scaling event occurs) in step S440. If no scaling event occurs, the process returns to step S430 to execute the fine-grain voltage scaling procedure and keep the predetermined system latency tolerance. If the frequency and voltage are to be further scaled, in step S450, the frequency and voltage of one operating point are first determined. Then, in step S460, the system latency tolerance is determined. Next, in step S470, the frequency and the voltage are scaled. After that, the process returns to step S430 to execute the fine-grain voltage scaling procedure again.

In the procedure described above, the steps S450 and S470 belong to the coarse-grain method (i.e., the steps for scaling frequency and voltage in a conventional DVFS system), and the steps S430 and S460 belong to the fine-grain method.

Figure 5:
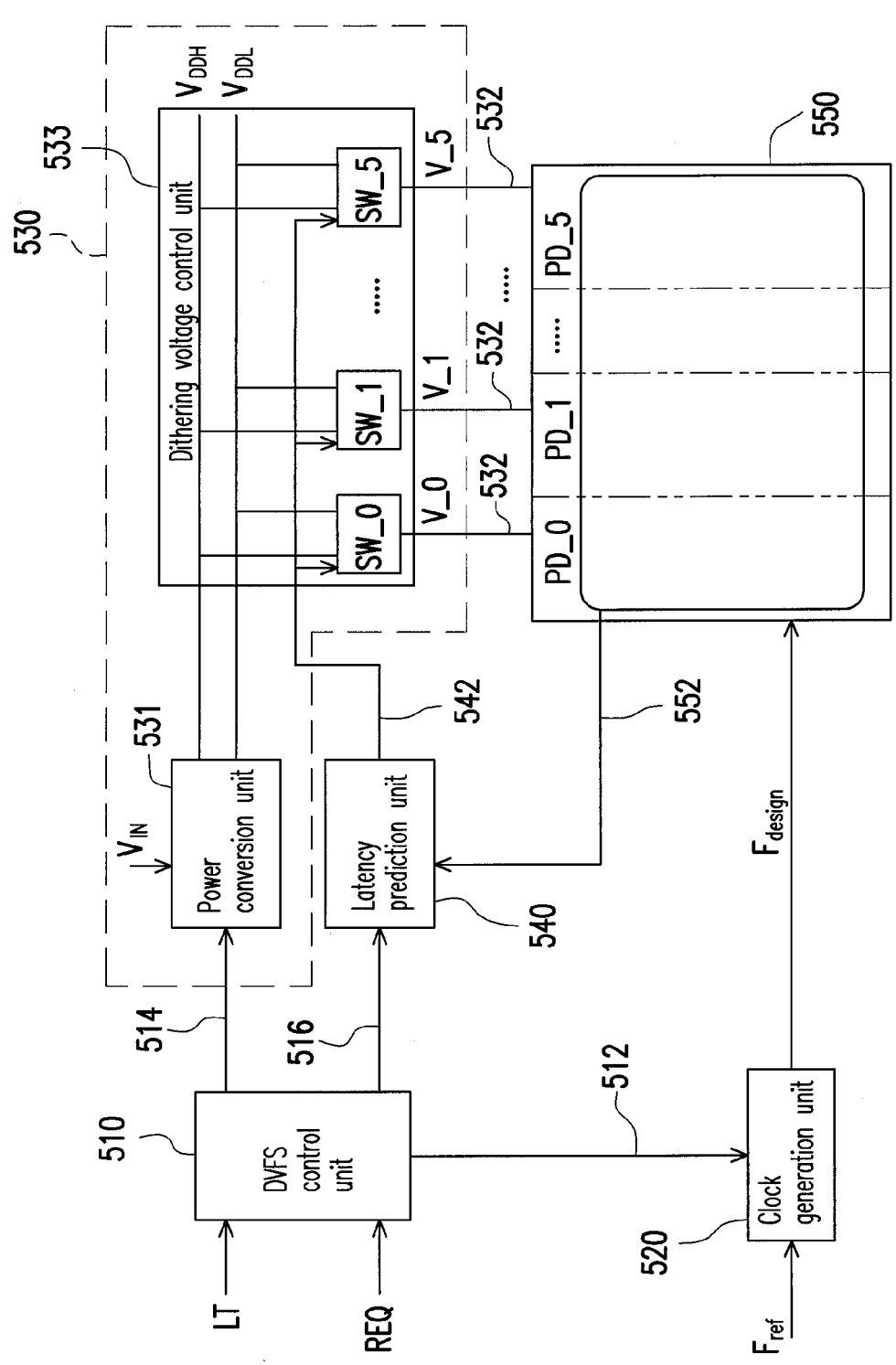
FIG. 5 is a detailed circuit block diagram of a voltage and performance management system adaptable to a processor having a low power consumption.

FIG. 5 is a detailed circuit diagram of a voltage and performance management system according to an embodiment of the present disclosure. Referring to FIG. 5, the voltage and performance management system 500 includes a DVFS control unit 510, a clock generation unit 520, an adaptive voltage scaling unit 530, a latency prediction unit 540, and a variable-latency processing unit 550.

When a performance scaling requirement event occurs (i.e., the DVFS control unit 510 is requested to scale the frequency and voltage), the DVFS control unit 510 receives a request signal REQ. After that, the DVFS control unit 510 determines whether the predetermined operating points are conformed to according to the request signal REQ.

If the frequency and voltage provided by one of the operating points are conformed, the operating point is directly selected for scaling the frequency and voltage. For example, a control signal 512 is sent to the clock generation unit 520 so that the clock generation unit 520 generates a clock signal corresponding to the frequency $F_{design}$ of the operating point. A control signal 514 is sent to the adaptive voltage scaling unit 530 so that the adaptive voltage scaling unit 530 generates a voltage 532 corresponding to the operating point and outputs the voltage 532 to the variable-latency processing unit 550.

However, if no operating point is supported corresponding to the performance requirement of a system application, the DVFS control unit 510 uses a received system latency tolerance LT as the reference parameter of the performance scaling operation. The DVFS control unit 510 sends the system latency tolerance 516 to the latency prediction unit 540.

The latency prediction unit 540 obtains an operation latency 552 of a datapath from the variable-latency processing unit 550. The operation latency 552 is obtained from the datapaths in different power domains in the variable-latency processing unit 550. For example, a plurality of power domains PD_0, PD_1, . . . , and PD_5 are illustrated. The latency prediction unit 540 further determines whether the average latency is greater than the system latency tolerance LT and outputs a control signal 542 to the adaptive voltage scaling unit 530.

The adaptive voltage scaling unit 530 includes a power conversion unit 531 and a dithering voltage control unit 533. The power conversion unit 531 receives the control signal 514 from the DVFS control unit 510 to perform a voltage conversion, and the power conversion unit 531 provides a high operation voltage $V_{DDH}$ and a low operation voltage $V_{DDL}$ to the dithering voltage control unit 533.

The dithering voltage control unit 533 has different switches corresponding to different power domains in the variable-latency processing unit 550. As shown in FIG. 5, the power domains PD_0, PD_1, . . . , and PD_5 are respectively corresponding to the switches SW_0, SW_1, . . . , and SW_5 in the dithering voltage control unit 533. The switches SW_0, SW_1, . . . , and SW_5 in the dithering voltage control unit 533 are controlled according to the control signal 542 so as to output a high operation voltage $V_{DDH}$ and a low operation voltage $V_{DDL}$ respectively to different power domains in the variable-latency processing unit 550 via different voltage lines 532. This will be described below with reference to an example.

If the operation capability of the variable-latency processing unit 550 exceeds the required operation capability, to reduce the power consumption, the operation capability of the variable-latency processing unit 550 is reduced. For example, the performance requirement of an specific application is 250 MHz. However, the variable-latency processing unit 550 has no corresponding operating point. Thus, it first selects (300 MHz, 1.2V) as the initial operating point and uses a 16% system latency tolerance to achieve the desired performance. The system latency tolerance is obtained through foregoing expression (2), wherein the desired frequency (250 MHz) is deduced from the lowest supported frequency (300 MHz), and the difference is then divided by the lowest supported frequency (300 MHz) to obtain the system latency tolerance. In the present example, the system latency tolerance is [(300−250)/300]×100%=16%.

The latency prediction unit 540 receives the operation latency 552 from the variable-latency processing unit 550. The operation latency 552 is the time spent by the variable-latency processing unit 550 for processing a plurality of instructions. For example, the variable-latency processing unit 550 spends 1.2 ms for processing 100 instructions. However, if 1 ms is originally expected to be spent on processing the 100 instructions, the operation latency 552 is 0.2 ms. Namely, the operation takes 20% more of the original expected time. This is only an exemplary embodiment but not intended to limit the present disclosure. Instead, the latency of the processor can be calculated through any other method.

When the variable-latency processing unit 550 starts to operate with the operating point of (300 MHz, 1.2V) but has not started the fine-grain scaling operation, the block voltages V_0-V_5 provided by the dithering voltage control unit 533 may all be 1.2V.

When the fine-grain scaling operation is started, the latency prediction unit 540 compares the operation latency 552 of the variable-latency datapath with the system latency tolerance to generate the control signal 542. The dithering voltage control unit 533 provides the block voltages V_0-V_5 corresponding to the power domains PD_0-PD_5 of the variable-latency processor according to the control signal 542, so as to adjust the processing speeds of the power domains PD_0-PD_5. The fine-grain scaling operation described above can be considered that the latency prediction unit 540 continuously monitors the variable-latency processing unit 550 and adaptively scales the variable-latency processing unit 550 through the voltages provided by the dithering voltage control unit 533.

After the fine-grain scaling operation is completed, the performance of the variable-latency processing unit 550 is approximately equivalent to the performance corresponding to the operation frequency of 250 MHz. Herein, the block voltages V_0-V_5 provided by the dithering voltage control unit 533 may be 0.8V, 0.8V, 1.2V, 1.2V, 1.2V, and 1.2V. After the scaling operation is completed, the power consumption of the variable-latency processing unit 550 is reduced. Thus, less power is consumed by scaling down the block voltages as described above.

Additionally, in the present embodiment, the block voltages V_0-V_5 of the variable-latency processing unit 550 can have many different combinations. Accordingly, the performance of the power domains PD_0-PD_5 can have many different combinations. Compared to the conventional performance scaling technique with the PLL structure, the performance scaling technique in the present embodiment offers a continuous (nearly stepless) performance scaling effect. Thus, the performance scaling technique in the present embodiment can be broadly applied to different performance requirements.

Figure 6:
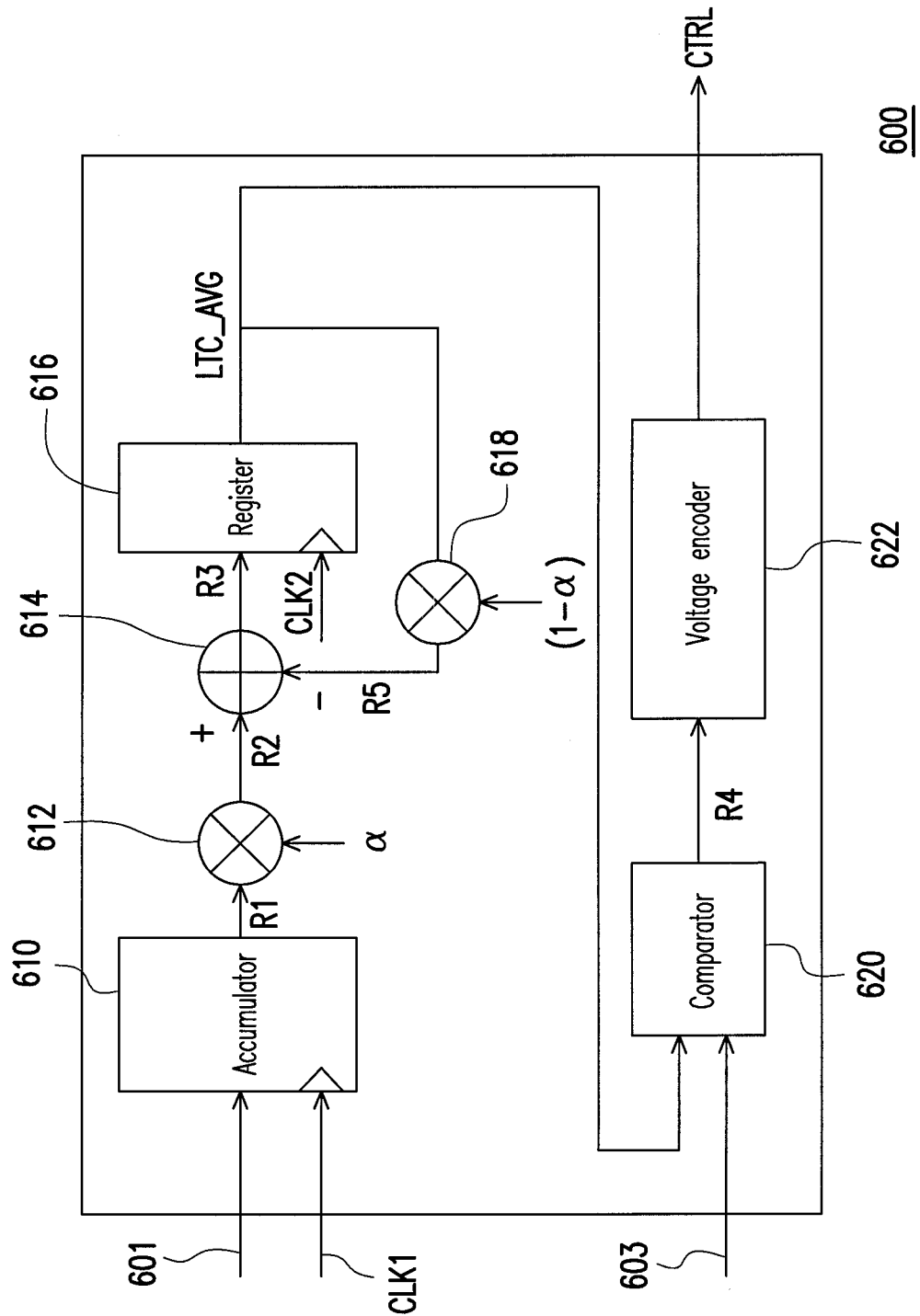
FIG. 6 is a circuit block diagram of a latency prediction unit according to an embodiment.

FIG. 6 is a circuit block diagram of a latency prediction unit according to an embodiment. The latency prediction unit 600 includes an accumulator 610, a first multiplier 612, an adder 614, a register 616, a second multiplier 618, a comparator 620, and a voltage encoder 622. In the latency prediction unit 600, a moving average of the latencies 601 of one or multiple datapaths in the power domains is calculated by using a single pole IIR filter, and then a corresponding voltage is generated by using a comparison circuit to control the block voltage of each power domain of the variable-latency processor. Below, the latency prediction unit 600 will be described in detail.

The accumulator 610 accumulates the system latency 601 according to a first clock signal CLK to generate a first operation result R1. Then, the first multiplier 612 multiplies the first operation result R1 by α to generate a second operation result R2. Next, the adder 614 deducts a fifth operation result R5 from the second operation result R2 to generate a third operation result R3. After that, the register 616 registers the third operation result R3 according to a second clock signal CLK2 to generate a latency average signal LTC_AVG. Herein the second multiplier 618 multiplies the latency average signal LTC_AVG by (1−α) to generate the fifth operation result R5.

The comparator 620 compares the system latency tolerance 603 with the latency 601 to generate a fourth operation result R4. Next, the voltage encoder 622 generates a control signal CTRL according to the fourth operation result R4 and provides a block voltage to each corresponding power domain of the variable-latency processor so as to adjust the processing speed of each power domain. For example, the block voltage is increased if the comparator 620 determines that the frequency of the latency average signal LTC_AVG is greater than the system latency tolerance 603. The block voltage is decreased if the comparator 620 determines that the frequency of the latency average signal LTC_AVG is smaller than the system latency tolerance 603. Finally, the block voltage is kept unchanged if the comparator 620 determines that the frequency of the latency average signal LTC_AVG is equal to the system latency tolerance 603.

As described above, in the voltage and performance management system provided by the present embodiment, the processing speed of the variable-latency processor is adjusted by adaptively scaling the block voltage of each power domain in the variable-latency processor (i.e., the latency of the variable-latency processor), so as to reduce power consumption, avoid latency, and achieve a stepless performance scaling effect.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A performance scaling device, adaptable to a processor which supports fine-grain performance scaling, the performance scaling device comprising:
    a variable-latency datapath, comprising a plurality of power domains, wherein an operation latency is generated according to the variable-latency datapath;
    a voltage scaling unit, generating a plurality of operation voltages and transmitting the operation voltages respectively to the power domains of the variable-latency datapath; and
    a latency prediction unit, receiving a system latency tolerance and the operation latency and generating a voltage scaling signal according to the system latency tolerance and the operation latency for the voltage scaling unit, so as to control the voltage scaling unit to output and scale the operation voltages of the power domains.

2. The performance scaling device according to claim 1 further comprising a clock generation unit and a dynamic voltage and frequency scaling (DVFS) control unit, wherein when a performance scaling event occurs, the DVFS control unit selects an operating point and outputs a clock control signal to the clock generation unit according to the operating point, and meanwhile, the DVFS control unit outputs an initial voltage control signal to the voltage scaling unit.

3. The performance scaling device according to claim 1, wherein the voltage scaling unit comprises:
    a voltage switching unit, for connecting the power domains of the variable-latency datapath respectively to a first operation voltage or a second operation voltage, wherein the first operation voltage is higher than the second operation voltage, and
    a voltage dithering control unit, for receiving the voltage scaling signal from the latency prediction unit, encoding the voltage scaling signal, and controlling the voltage switching unit to connect the power domains respectively to the first operation voltage or the second operation voltage according to the encoded voltage scaling signal.

4. A performance scaling device, adaptable to a processor that supports fine-grain performance scaling, the performance scaling device comprising:
    a variable-latency datapath, generating an operation latency according to the variable-latency datapath;
    a voltage scaling unit, generating a plurality of operation voltages and transmitting the operation voltages to the variable-latency datapath so that the variable-latency datapath operates with different latencies according to the operation voltages; and
    a latency prediction unit, receiving a system latency tolerance and the operation latency and generating a voltage scaling signal for the voltage scaling unit according to the system latency tolerance and the operation latency, so as to control the voltage scaling unit to output and scale the operation voltage of a power domain.

5. The performance scaling device according to claim 4 further comprising a clock generation unit and a dynamic voltage and frequency scaling (DVFS) control unit, wherein when a performance scaling event occurs, the DVFS control unit selects an operating point and outputs a clock control signal to the clock generation unit according to the operating point, and meanwhile, the DVFS control unit outputs an initial voltage control signal to the voltage scaling unit.

6. The performance scaling device according to claim 4, wherein the voltage scaling unit comprises a voltage control unit, and the voltage control unit receives the voltage scaling signal from the latency prediction unit and generates a corresponding control signal for a power management integrated circuit (PMIC).

7. A processor, comprising:
    a variable-latency datapath, operating with different latencies and generating an operation latency;
    an instruction dispatcher, receiving the operation latency of the variable-latency datapath, determining whether to stop dispatching operations to the datapath according to the operation latency of the variable-latency datapath, generating a stall signal for the datapath, and waiting for the variable-latency datapath to complete operation;
    a voltage scaling unit, for generating a plurality of operation voltages and transmitting the operation voltages to the variable-latency datapath;
    a performance scaling device, for receiving the operation latency of the variable-latency datapath and a system latency tolerance and generating a voltage scaling signal for the voltage scaling unit according to the operation latency of the variable-latency datapath and the system latency tolerance, so as to control the operation voltage of the variable-latency datapath.

8. The processor according to claim 7, wherein the performance scaling device further comprises a clock generation unit and a dynamic voltage and frequency scaling (DVFS) control unit, when a performance scaling event occurs, the DVFS control unit selects an operating point and outputs a clock control signal to the clock generation unit according to the operating point, and meanwhile, the DVFS control unit outputs an initial voltage control signal to the voltage scaling unit.

9. The processor according to claim 7, wherein the voltage scaling unit of the performance scaling device comprises:
   a voltage switching unit, for connecting the power domains of the variable-latency datapath respectively to a first operation voltage or a second operation voltage, wherein the first operation voltage is higher than the second operation voltage; and
   a voltage dithering control unit, for receiving the voltage scaling signal from the latency prediction unit, encoding the voltage scaling signal, and controlling the voltage switching unit to connect the power domains to the first operation voltage or the second operation voltage according to the encoded voltage scaling signal.

10. The processor according to claim 7, wherein the voltage scaling unit of the performance scaling device comprises:
    a voltage control unit, for receiving the voltage scaling signal from the latency prediction unit and generating a corresponding control signal for a PMIC.

11. A performance scaling method of a processor, comprising:
    selecting one of a plurality of operating points supported by a processor according to a performance requirement, wherein a frequency of the operating point is greater than or equal to a frequency of the performance requirement;
    when the frequency of the performance requirement is equal to the frequency of the operating point, adopting the frequency of the operating point and a corresponding operation voltage,
    when the frequency of the performance requirement is smaller than the frequency of the operating point, adopting the frequency of the operating point, setting an operation voltage corresponding to the frequency of the operating point as an initial value, and setting a system latency tolerance to perform adaptive voltage scaling, wherein in the step of setting the system latency tolerance, the frequency of the performance requirement is deducted from the frequency of the selected operating point to obtain a difference, and the difference is divided by the frequency of the selected operating point.

12. A performance scaling method of a processor, comprising:
    selecting one of a plurality of operating points supported by a processor according to a performance requirement, wherein a frequency of the operating point is greater than or equal to a frequency of the performance requirement;
    when the frequency of the performance requirement is equal to the frequency of the operating point, adopting the frequency of the operating point and a corresponding operation voltage,
    when the frequency of the performance requirement is smaller than the frequency of the operating point, adopting the frequency of the operating point, setting an operation voltage corresponding to the frequency of the operating point as an initial value, and setting a system latency tolerance to perform adaptive voltage scaling, wherein the step of performing the adaptive voltage scaling comprises performing a moving average on an operation latency of a variable-latency datapath to obtain a moving average value, and continuously comparing the moving average value with the system latency tolerance so as to continuously output and scale the operation voltage.

* * * * *